United States Patent [19]
Hegg

[11] Patent Number: 5,456,428
[45] Date of Patent: Oct. 10, 1995

[54] MECHANICALLY LINKED ACTIVE SIDESTICKS

[75] Inventor: Jeffrey W. Hegg, North Redington Beach, Fla.

[73] Assignee: Honeywell Inc., Minneapolis, Minn.

[21] Appl. No.: 95,870

[22] Filed: Jul. 21, 1993

[51] Int. Cl.⁶ .................................................. B64C 13/12
[52] U.S. Cl. ........................................................ 244/229
[58] Field of Search ............................... 244/194, 195, 244/197, 228, 229, 234, 235, 336, 17.13

[56] References Cited

U.S. PATENT DOCUMENTS

| | | | |
|---|---|---|---|
| 2,958,484 | 11/1960 | Ross | 244/197 |
| 3,140,843 | 7/1964 | Pettit | 244/197 |
| 3,528,633 | 9/1970 | Knemeyer | 244/228 |
| 3,576,302 | 4/1971 | Palfreyman | 244/236 |
| 4,122,927 | 10/1978 | Berg | 244/229 |
| 4,603,388 | 7/1986 | Griffith et al. | 244/17.13 |
| 5,125,602 | 6/1992 | Vauvelle | 244/229 |
| 5,149,023 | 9/1992 | Sakurai et al. | 244/229 |
| 5,156,363 | 10/1992 | Cizewski et al. | 244/229 |

Primary Examiner—Galen L. Barefoot
Attorney, Agent, or Firm—Thomas A. Rendos

[57] ABSTRACT

Conventional column controls for aircraft flight control systems are replaced by active sidesticks which are connected to port and starboard aircraft mechanical, electrical or hydraulic systems by means of servo motors and cables. Movement of the active sidestick handles is detected and a signal generated to drive a servo motor in manner corresponding thereto, which in turn will drive cable assemblies which control aircraft flight control surfaces. Two sidesticks are provided, preferably with an electrical cross-cockpit interconnect to cause movement of one sidestick to result in a signal being transmitted to a second sidestick to cause the motor thereof to force the sidestick to track the movement of the first sidestick. In an alternative implementation, the sidesticks are employed in a fly-by-wire system with a conventional cable system as backup. The cable system is disengaged from the sidesticks by means of a disengage clutch whereupon failure of the fly-by-wire system, the clutch will engage the cable system and provide a mechanical backup to the fly-by-wire system in the event of failure thereof.

5 Claims, 7 Drawing Sheets

MECHANICALLY LINKED ACTIVE SIDESTICKS

FIELD OF THE INVENTION

This invention relates to the use of active sidestick hand controllers as replacements for columns employed in conventional column controlled flight control systems. More specifically, the invention relates to the use of the active sidesticks as an improved replacement for convention column controls, or alternatively, for use in a fly-by-wire system with a backup mechanical linkage between the sidestick and the flight control system in the event of failure of the fly-by-wire system.

BACKGROUND OF THE INVENTION

Conventional column-type flight control systems have typically included paired columns for a pilot and copilot. Each column includes handgrips on what can be termed a steering wheel. The columns are pivotable along one axis to control pitch of an aircraft and the steering wheel serves to control roll of the aircraft.

Typically, the two columns are mechanically cross-linked and are connected to parallel mechanical systems (one for port side and one for starboard side) which control the aircraft flight control surfaces. Specifically, each system consists of cables connected by means of pulleys to the aircraft systems (e.g. mechanical, electrical or hydraulic) which in turn control the flight control surfaces in a manner corresponding to movement of the column or the steering wheel thereof. In the event of failure of one of the parallel systems of a corresponding column, the two columns which are mechanically cross-linked can be disconnected by means of a selective connection mechanism.

A disadvantage in these types of systems is that they are often bulky, require significantly more space in an aircraft cockpit and involve addition of servo and trim motors connected to the cable system for autopilot backdrive and trim. Thus, it becomes desirable to replace such systems with active sidesticks, including servomotors, which are smaller and easier to use in controlling an aircraft then conventional column control systems.

SUMMARY OF THE INVENTION

In accordance with one aspect of the invention, conventional columns in a column controlled system are replaced with active sidesticks for a pilot and a copilot which link through means of servo motors to cables linking to the control systems of an aircraft. Thus, in one aspect, there is provided an active hand controller system which comprises a manual control stick moveable along a pitch axis (x) and a roll axis (y). Sensors are provided for detecting the movement and force of the manual control stick along at least one of the two axes for generating signals representative of the movement and force. Control electronic of the type disclosed in co-pending application Ser. Nos. 07/957,427, 07/957,278 and 07/957,216, serve to receive the signals from the sensors for generating a control signal in response thereto for controlling at least one servo motor per axis connected to the manual control stick. The servo motor is connected to the manual control stick and to cable linkages of the type in use in conventional column control systems, which are connected to an aircraft's mechanical, electrical or hydraulic flight control system. The servo motor when controlling the axis in response to the control electronics will also control the cable linkages which are connected to the aircraft flight control system.

In a more specific aspect, the system of the invention includes two manual control sticks arranged in a dual cockpit configuration and having a cross feed of signals to also have the control electronics provide a signal from one control stick and cable linkages to the other to cause the other control stick and cable linkages to move in a manner duplicative of the manner in which the first control stick is moved.

In an alternative implementation of the invention, there is provided an active hand controller for a fly-by-wire flight control system of an aircraft of the type disclosed in co-pending application Ser. Nos. 07/957,427, 07/957,278 and 07/957,216, which disclosures are incorporated by reference herein. In this embodiment the manual control stick is electrically connected to the flight control system to provide a command signal from the control electronics as is disclosed in said co-pending applications.

For the fly-by-wire implementation the cable system leading to the aircraft mechanical, electrical or hydraulic flight control system operates only as a backup with the control stick disengaged from the cable and linkages by means of a clutch which is in a disengaged condition when power is on, but which engages the cable system should there be a failure of the fly-by-wire system such that with or without the servo motors using the manual control stick, the pilot or copilot can maintain control of the aircraft. In the event power to the servo motors or the manual control sticks fails, the motors are selected to be backdrivable with forces applied to the control stick (e.g., forces on the stick will cause motion) so as to not obstruct movement of the cables as a result of a pilot or copilot applying force to the handle of the control stick.

BRIEF DESCRIPTION OF THE DRAWINGS

Having briefly described the invention, the same will become better understood from the following drawings which are discussed later in detail in the detailed discussion of the invention, wherein.

DETAILED DISCUSSION OF THE INVENTION

Figures 1A, 1B:
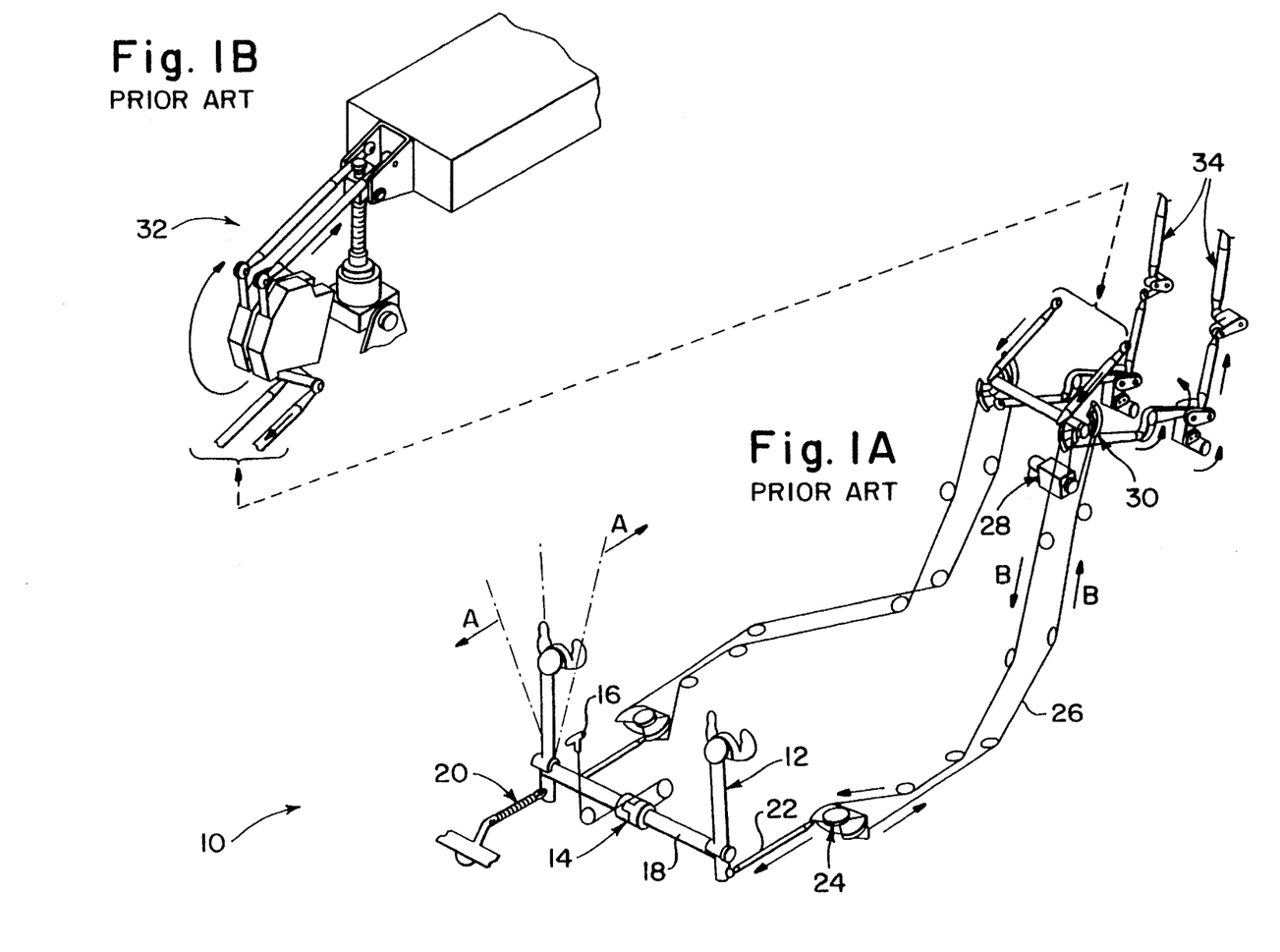
FIGS. 1a and 1b are perspective views of a schematic illustration of a prior art column pitch control system.
Figure 2:
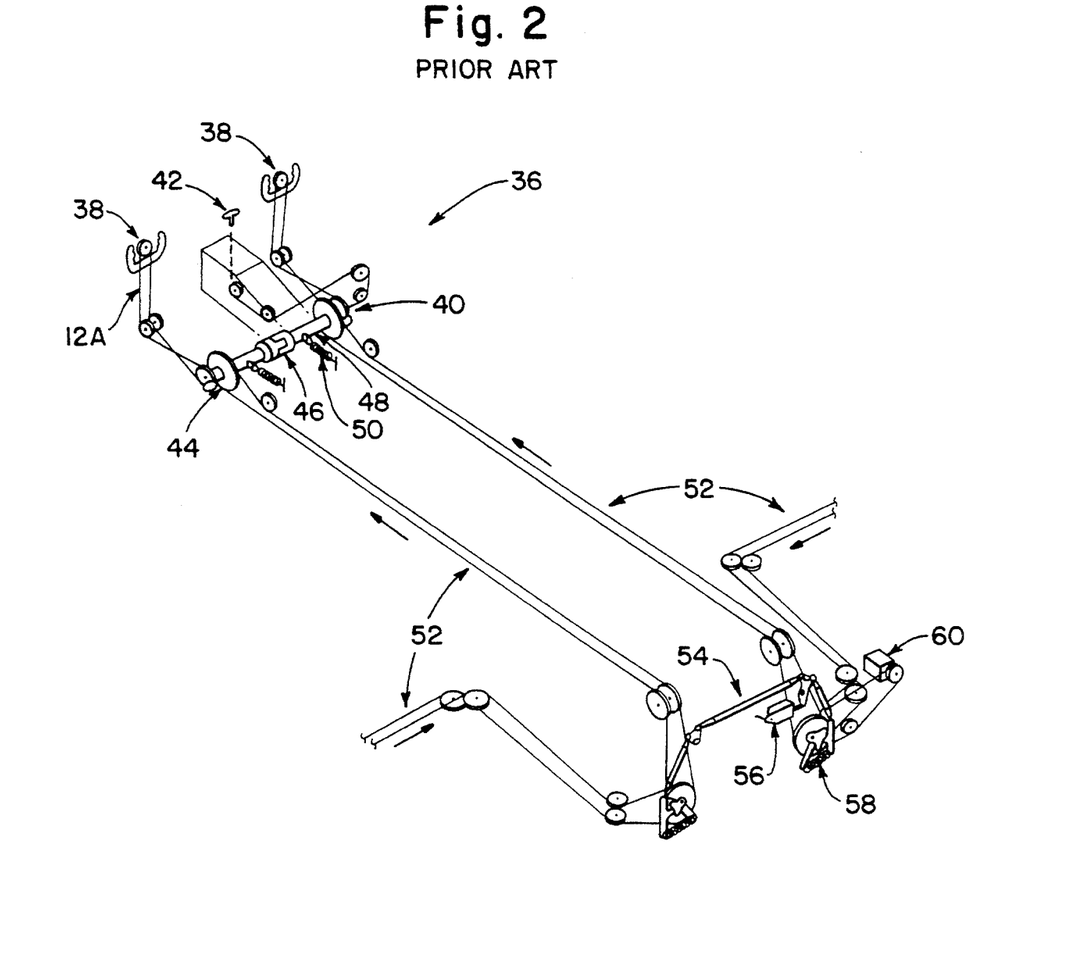
FIG. 2 is a perspective view like that of FIGS. 1a and 1b of a prior art column roll control system in use in aircraft.

Prior to discussing the invention, the prior art conventional column systems as illustrated in FIGS. 1a, 1b and 2 will be discussed. As shown in FIG. 1a, the system for pitch control is generally designated by the numeral 10. Two columns 12 are arranged in a parallel arrangement and are pivotable in a manner shown by arrows A. The columns are interconnected by means of interconnect shaft 18 which includes a pitch mechanical disconnect which can serve to disconnect one column from the other by pulling handle 16. A conventional control column balance spring 20 stabilizes movement and use of the column 12. As further illustrated in FIG. 1a, a link 22 to the forward quadrant pitch cable pulley assembly 24 connects the column 12 to cable 26, which in turn leads to and is connected to the aft quadrant 30 of the system 10. The connection at the aft quadrant 30 leads to the mechanical, electrical or hydraulic system of the flight control system through load limiters 34 for control thereof. Since the columns 12 are connected to the flight control system by means of cables 26, the "feel" of a mechanically linked system is not ordinarily maintained at the column for the users thereof. In order to ensure such "feel," as shown by the dashed line, there is connected to the cables 26 a pitch feel simulator unit 32 of conventional construction, as shown in FIG. 1b. An autopilot servo 28 serves to provide movement to the column in a manner corresponding to control pitch of the aircraft by the autopilot when the autopilot is engaged.

FIG. 2 further illustrates the roll control assembly 36 of the prior art column controlled system. The steering wheel 38 is connected to cables 12a and is shown connected by means of forward quadrant 44 to cable assembly 52 which serves to control roll as connected to port and starboard aileron controls of an aircraft. There is provided a roll disconnect mechanism 40 which enables the cables 12a to be disconnected from each other by merely pulling at handle 42 which then disconnects the two columns at the roll mechanical disconnect 46. Balance springs 50 are arranged in a conventional configuration to maintain balance between the parallel systems of cables 12a. The cables 52 lead to the aft quadrant (not numbered) and are connected in a conventional configuration to a trim mechanism 54, trim actuator 56, and as in the case with the pitch control system of FIGS. 1a and 1b, there is provided an artificial feel unit 58 to provide artificial feel to the steering wheels 38. An autopilot servo 60 serves to provide movement to the wheel in a manner corresponding to control roll of the aircraft by the autopilot when the autopilot is engaged.

Figure 3:
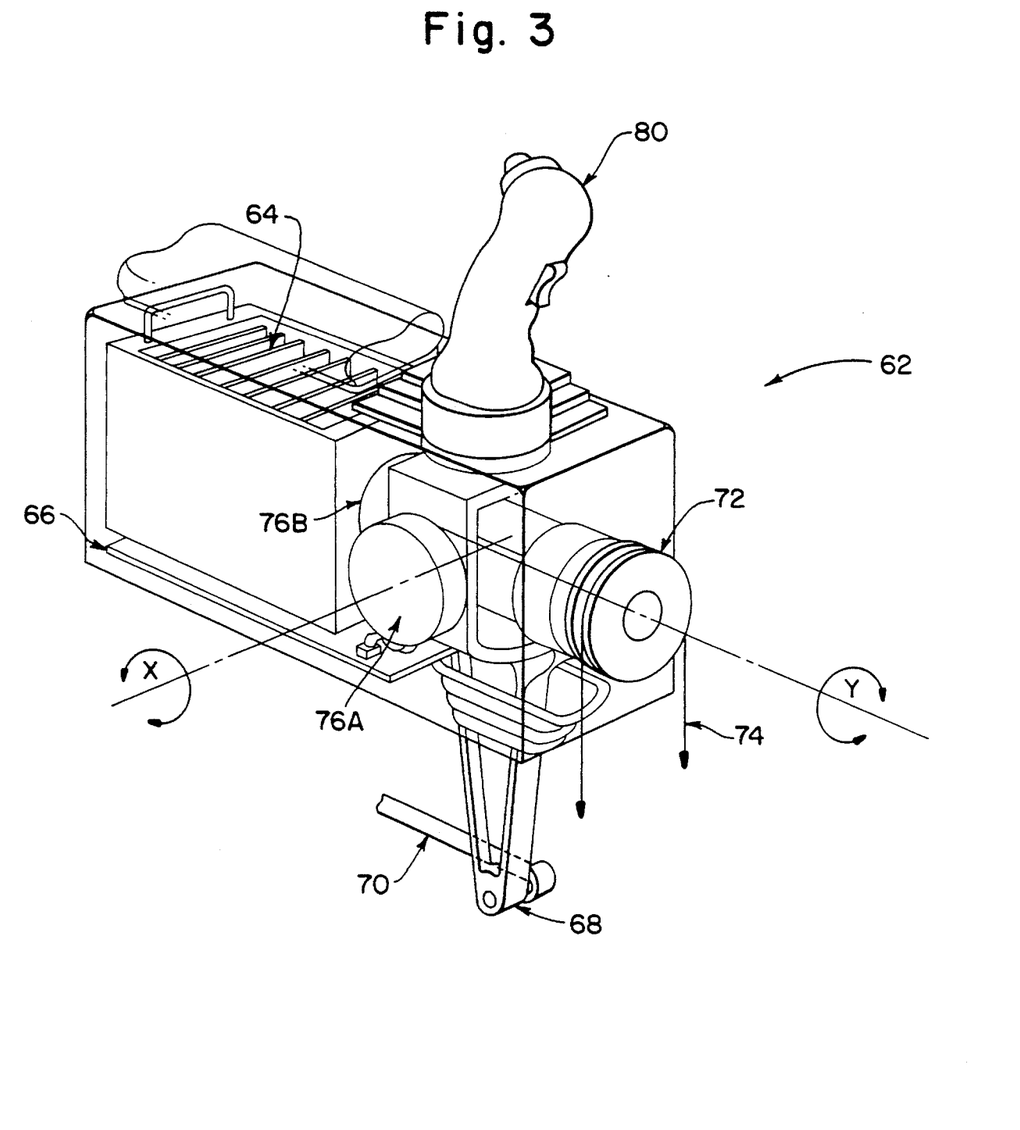
FIG. 3 is a perspective view, partly transparent illustration, of a mechanically linked active sidestick of the type for use in the system of the present invention.

FIG. 3 schematically illustrates in partial transparent and perspective view, a mechanically linked active sidestick 62 of the type employed in the present invention. The active sidestick 62 includes a handle 80 which is moveable about a pitch axis (x) and a roll axis (y). The handle 80 includes connected thereto at least one motor on each axis generally illustrated by the number 76a for the pitch axis and 76b for the roll axis. Although one motor is shown numbered for each axis, it will be appreciated that more than one can be employed, depending on the redundant configuration.

Connected to motor 76a is a pitch interface link 68 which has connected thereto a push rod 70 which leads to the forward quadrant cable pulley in both embodiments of the present invention. Connected to the motor 76b, is a roll pulley assembly 72 including cable 74, also implemented in both embodiments of the present invention. The roll cable 74 and the push rod 70 are connected to the forward quadrant in a manner similar to that illustrated in FIGS. 1a–2.

A mother board 66 interconnects the control electronics 64 sensors connected (not shown) to handle 80 to detect movement and force thereof and generate a signal, typically a position signal, or even a force signal as a result of force applied to and movement of handle 80 caused by a user. The operation of the control electronics through the sensors as well as the motors 76a and 76b will not be detailed further herein but is as described in co-pending application Ser. Nos. 07/957,427, 07/957,278 and 07/957,216. The control electronics serve to control the operation of the motors in response to a pilot's use of the handle 80 to cause the motor to drive the pitch and roll linkages and cables as well as to drive movement of the handle 80 in response to any external control signal being received by the electronics, which are then processed and transmitted to a respective motor 76a or 76b to move a respective handle 80. The motors 76a and 76b provide the "feel" to the system during piloted operation.

Specific implementation of the gimbal configuration for the roll and pitch implementation will require consideration of decoupling motion of the innermost gimbal from the outermost gimbal. One option is with roll as the innermost and pitch as the outermost, then a decouple mechanism can be implemented similar to that achieved on previous purely mechanically linked systems such as the commercially available military Cobra helicopter forward sidestick configuration. This decouple mechanism has been implemented in prior art and as such is not a subject matter of this invention.

Figure 4:
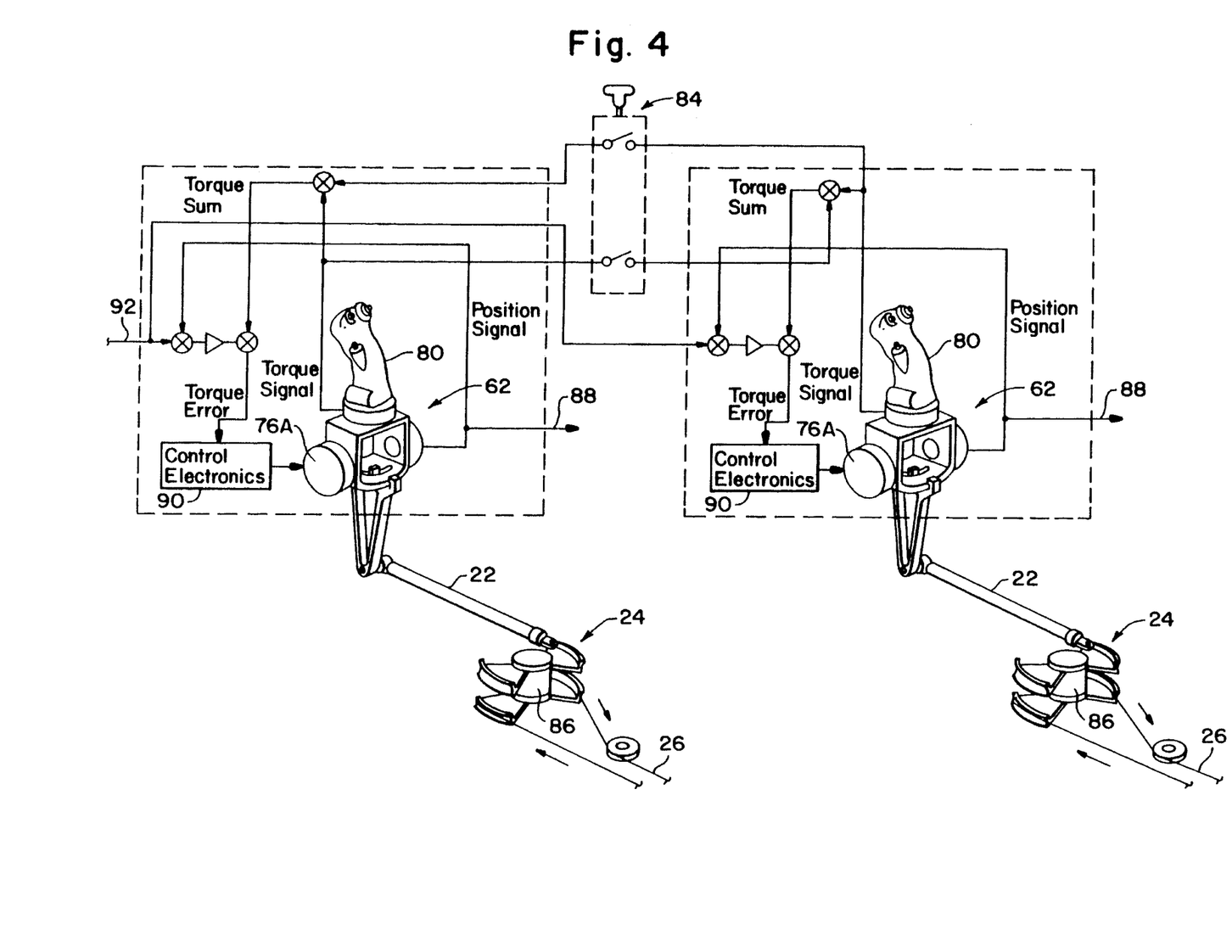
FIG. 4 is a schematic diagram showing in perspective view two active sidesticks in accordance with the invention employed with a backup linkage and cable, clutch operated system in accordance with the invention as implemented on a fly-by-wire system for pitch control with the sidesticks cross-linked electronically across the cockpit.

A first embodiment of a pitch control system in accordance with the invention is generally illustrated at FIG. 4. In FIG. 4, the pitch control system mechanically connected to the aircraft flight control system is essentially the same as illustrated in FIG. 1a without the mechanical interconnect shaft, and in addition, a disengage clutch 86 for pitch is configured so that the active sidesticks 62 are disengaged from the cables 26 when power is on. Thus in this configuration, the system is employed in a fly-by-wire system wherein the aircraft flight control surfaces are controlled by electrical signals transmitted through lines 88 from the respective active sidesticks 62.

Movement of the handles 80 results in position and force signals being transmitted and processed by control electronics 90 to be transmitted to the respective motor 76a, and such movement also results in a direct signal for control of the fly-by-wire system being transmitted through lines 88, depending on which handle is moved as is described in said above-referenced co-pending applications.

Thus, movement of the pilot handle 80 on the left side of the drawing will result in a control signal being transmitted on its line 88, as well as a torque signal for electronic coupling being transmitted by means of switch 84 when closed, to the control electronics 90 of the copilot, i.e., right side, to result in a signal being fed to motor 76a to cause the handle 80 to move in a manner corresponding to that of the pilot handle 80 on the left side. As may be appreciated, also shown is a center command control line 92 for inputting a number of different signals, for example, for signals from an autopilot system and for signals in response to the flight control surfaces being forced to move by external forces. Such an applied signal results in a corresponding movement of both handles 80 caused by being driven by the respective motors 76a.

As will be appreciated, upon failure of the fly-by-wire system, a number of things can occur. First, a complete system shutdown may occur (e.g., power loss), in which case the clutches 86 will close allowing the handle 80 to be driven to drive the cables 26 to maintain control of the aircraft flight control system. In the case of total system failure including failure of power to motors 76a, the motors are backdrivable and as such will not impede movement of the handle 80 and cables 26. Thus, the handles 80 are moved based on pure physical strength of pilot and copilot alone resulting in degraded pilot "feel". An alternative failure can occur when there is a failure of the electronics of the fly-by-wire system, but power is maintained to motors 76a. In this scenario the motors 76a drive the cables in a manner where not much force is required of the pilot or copilot in moving the control stick handles 80.

One alternative configuration of the embodiment of FIG. 4 can include a mechanical interconnecting cross-link similar to that of FIG. 1a connecting the copilot and pilot active sidesticks 62 not only electrically by means of switch 84 but also mechanically with a shaft similar to interconnect shaft 18 also having a mechanical disconnect 14 for pitch as shown in FIG. 1a. The clutches 86 will allow engagement of the mechanical linkage flight control system as presented or independently engage or disengage the mechanical cross-link interconnecting shaft.

A second alternative configuration of the embodiment is to mechanically cross-link the pilot and copilot sidesticks only without the use of the electrical cross coupling torque signal. The clutches 86 can be used to engage or disengage either the flight control system or the mechanical interconnection.

Figure 5:
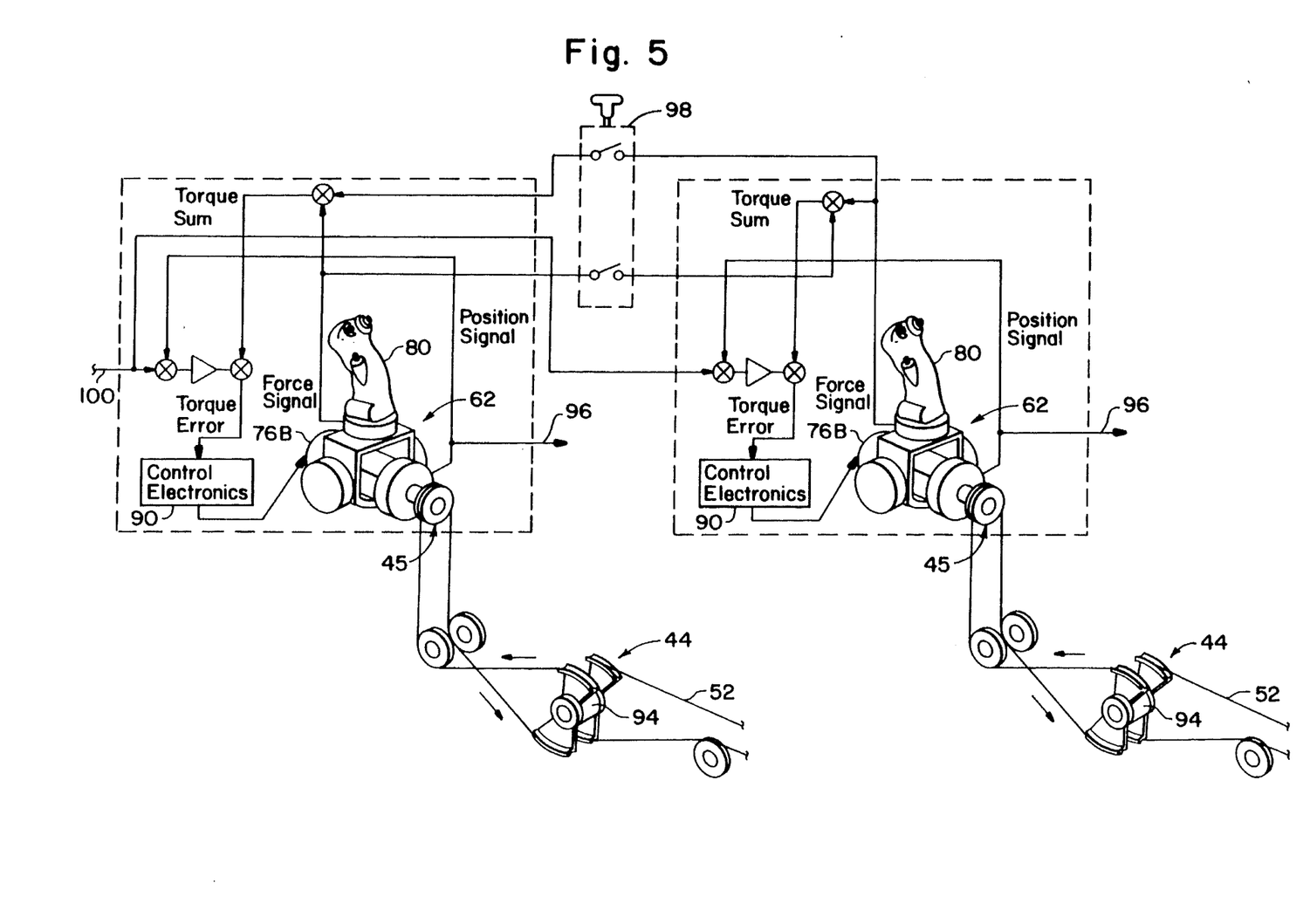
FIG. 5 is a view as in FIG. 4 but illustrating the fly-by-wire system with the backup cable system in accordance with the invention for roll control with the sidesticks crosslinked electronically to ensure that they track each other in operation.

The roll control system of this embodiment of the invention is shown in FIG. 5 in a manner similar to that of FIG. 4. It will be appreciated that the control electronics is likewise similar to that disclosed in co-pending application Ser. Nos. 07/957,427, 07/957,278 and 07/957,216, and need not be disclosed in greater detail herein with reference being made to said co-pending applications for the details of said electronics.

In the roll control system, a roll clutch 94 serves to disengage the mechanical system and cables 52 at the forward quadrant roll cable pulley assembly 44 from the active sidesticks 62. The active sidesticks are typically connected and interfaced to the forward quadrant pulley 44 through a roll output pulley 45. A control signal in the fly-by-wire mode is typically generated by movement of the handles 80 by the sensor thereof and transmitted through lines 96 to the fly-by-wire control system.

As in the case with the pitch control of FIG. 4, the torque coupling signals are interconnected by means of a switch 98 which serve to transmit cross signals between active sidestick assemblies 62 to ensure that they track each other in movement by processing the cross signals in the respective control electronics 90, which are then transmitted to motors 76b to drive the handles 80. Likewise, a center command or autopilot signal is also transmitted to the roll axis of the system by means of an input line 100 as illustrated in FIG. 5.

As will be appreciated, first and second alternative variations of both mechanical and electrical interconnection between the pilot and copilot roll control systems will be effected in the same manner as discussed with reference to FIG. 4. First, a mechanical cross-link can be provided similar to that of roll interconnect shaft 48 of FIG. 2 in addition to the electrical interconnection. Secondly, the connection through switch 98 between the torque coupling signals can be such that there is no connection resulting in only the mechanical interconnect shaft 48.

Having thus described the pitch and roll control system employing active sidestick 62 in accordance with this first embodiment of the invention as implemented on a fly-by-wire system with a mechanical backup, the second embodiment of the invention will be discussed with reference to FIGS. 6 and 7.

Figure 6:
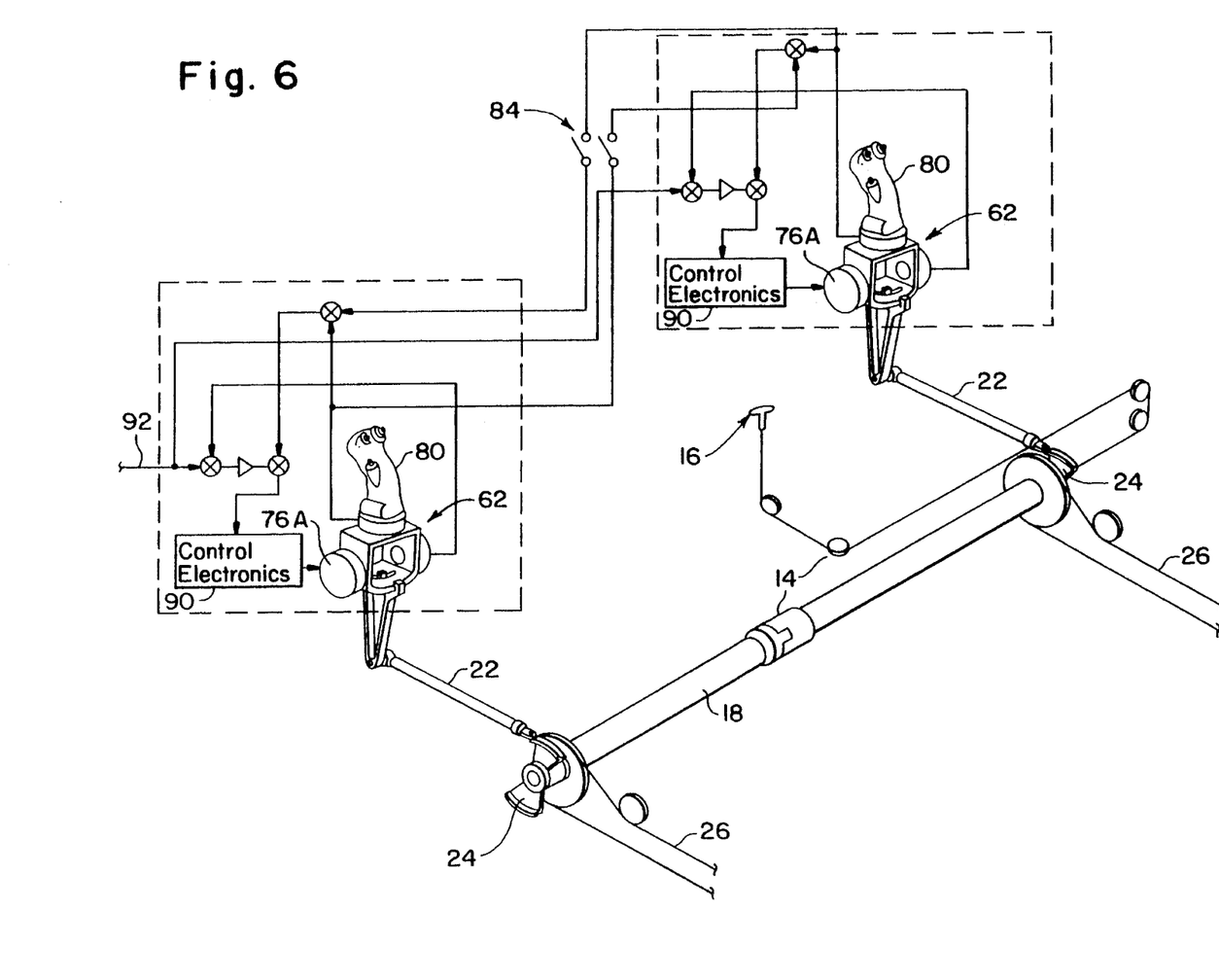
FIG. 6 is a view as in FIG. 5 showing an alternative embodiment of the invention wherein the active sidesticks are employed in a direct mechanical connection to a conventional column-type cable driven system for use in controlling pitch, also the sidesticks are cross-linked electronically and mechanically to ensure that they track each other in operation.
Figure 7:
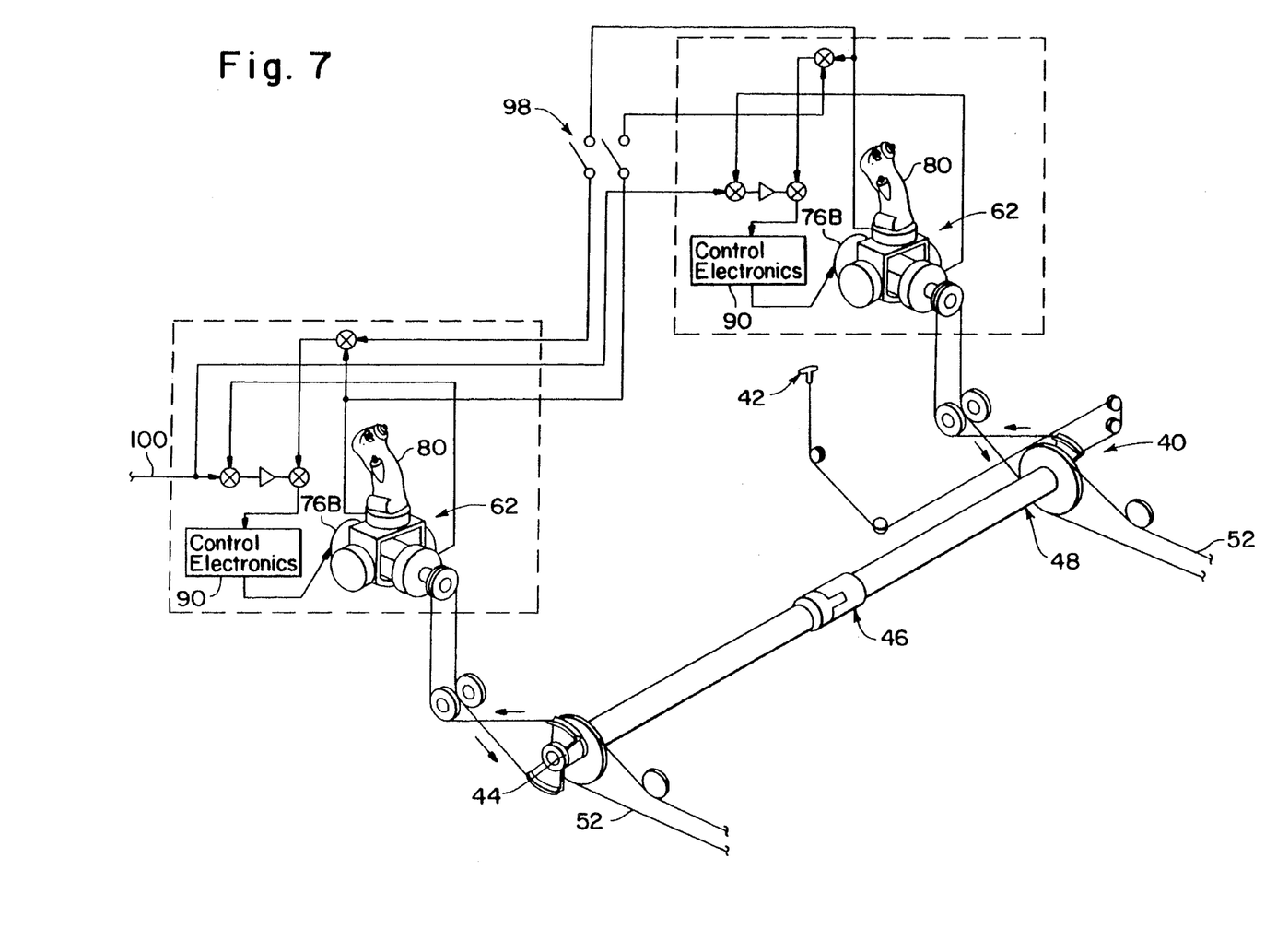
FIG. 7 is a view as in FIG. 6 but showing the active sidestick employed in a roll control arrangement.

The embodiment of FIGS. 6 and 7 contemplates the use of the active sidestick 62 as a direct substitution for the conventional mechanical column 12 of FIGS. 1a, 1b and 2. Specifically, as will be appreciated from the drawing, since the sidesticks of 62 of necessity employ motors 76a and 76b and electronics electrically cross-linking them, there will be some electronics involved similar to that disclosed in the co-pending application Ser. Nos. 07/957,427, 07/957,278 and 07/957,216, but there is no electrical connection to a fly-by-wire system as generally illustrated by lines 88 and 96 of FIGS. 4 and 5.

Further simplification in the embodiments illustrated in FIGS. 6 and 7 from FIGS. 4 and 5, is that flight control is achieved through the cables 26 and 52 respectively connected to the aircraft mechanical, electrical or hydraulic flight control system. The clutches 86 and 94 of FIGS. 4 and 5 for the fly-by-wire implementation are eliminated in the preferred configuration shown in FIGS. 6 and 7 for pitch and roll control respectively for flight control with a mechanically linked sidestick. The systems illustrated in FIGS. 6 and 7 have the advantage of the servo motors 76a and 76b driving the cables 26 and 52, wherein not much force is required of the pilot and copilot in moving the control stick handles 80. Additional benefits are achieved because the servo motors 76a and 76b are used to achieve the functions of FIGS. 1a and 2 autopilot servo 28 and 60 with associated mechanisms and the FIG. 2 trim servo 56 with associated mechanisms, thereby simplifying the mechanical control system reducing complexity and weight.

FIG. 6 generally illustrates the connection of the active sidesticks 62 in a manner similar to that of FIG. 1a and including an interconnect shaft 18 with a pitch mechanical disconnect mechanism 14 which is activated by handle 16. As in the case with FIG. 1a, the system for pitch control is connected by means of cables 26 through forward quadrant pulley 24 which is in turn driven by the link 22 to the forward quadrant.

As may be appreciated, the active sidestick 62 handle 80 may be driven to result in signals picked up by sensors and transmitted to control electronics 90. The control electronics 90 translates the signal into a motor control signal which is transmitted to motor 76a. The motor 76a as a result drives the linkage 22. As may be appreciated, the motor 76a is selected to be of a type sufficiently powerful and effective to drive the linkage 22 to control the cables 26 which in turn drives the aircraft mechanical, electrical or hydraulic systems for control of the flight control surfaces.

The active sidesticks 62 are also electronically interconnected through switch 84 such that, for example, when the left side pilot handle 80 is moved, a torque signal for electronic coupling is transmitted by means of switch 84 when closed to corresponding control electronics 90 of the copilot sidestick 62 to result in an augmented signal being transmitted from the control electronics 90 to motor 76a to drive handle 80 in a manner corresponding to the movement of the other handle 80. The electronic disconnect switch 84 for the electronic coupling can be simultaneously controlled by the disconnect handle 16 when mechanical cross-cockpit disconnect mechanism 14 is selected. The cross-cockpit tracking between the pilot and copilot sidesticks will be dominantly controlled by the electrical interconnection through switch 84 because of the inherent backlash and compliance in the mechanical interconnection via shaft 18 and associated mechanisms. Likewise, the system can be configured to include an electrical input through line 92 from external sensors detecting the movement of flight control surfaces or, for example, from an autopilot system which would ensure that the handles 90 track the movement of the flight control surfaces or the commands of the autopilot system to the flight control surfaces.

As may also be appreciated, making reference to the embodiments of FIGS. 4 and 5, an alternative interconnect between the two active sidestick systems 62 from FIGS. 6 and 7 can be achieved. The first alternative from FIGS. 6 and 7 may be configured such that only electrical signals are transmitted between sidesticks 62. With this alternative, the complete electrical interconnect can be maintained but the mechanical interconnect through shaft 18 can be eliminated. The second alternative from FIGS. 6 and 7 is to eliminate the electrical interconnection 84 between the sidesticks and maintain only the mechanical interconnect through shaft 18. The specifics are a matter of design choice for the particular aircraft involved.

FIG. 7 illustrates the roll control system in a manner similar to that of FIG. 5 and FIG. 6. In this case, there is also no control signal line to a fly-by-wire system but the active sidesticks 62 are interconnected electrically through switch 98 in a manner similar to that of FIG. 6. The roll control mechanical interface is via the roll control pulley illustrated using the number 45 again. There is a direct link by means of forward quadrant pulley 44 to the cables 52 which in turn control the roll flight control surfaces, i.e., ailerons, of the aircraft. As in the case with the pitch control of FIG. 6, lines 100 serve to provide an electrical input which is reflective of either movement of the flight control surface or is a signal from an autopilot system to ensure tracking between the handle 80 and the autopilot system.

Likewise, as in the case with FIG. 6 various permutations can be set up wherein the mechanical cross link can be eliminated or the electrical cross link can be eliminated between the active sidestick 62.

Having generally described the invention in detail, the same will be better understood from the following claims which set forth the invention in a non-limiting manner.

What is claimed is:

1. An active hand controller system comprising:

first and second active control handles each moveable along a pitch axis (x) and a roll axis (y), each of the first and second handles including:

sensor means for detecting movement of and force applied to the respective first and second active control handle along said pitch axis (x) and said roll axis (y) for generating a signal representative of said movement and force applied thereto;

control electronics means for receiving said signal from said sensor means and for generating a control signal in response thereto representative of the movement and force applied to the respective first and second active control handle, the control electronics means of the respective first and second control handles being coupled to one another; and at least one servo motor connected to each of the pitch and roll axes of each of the first and second active control handles and to respective cable linkages connected to an aircraft flight control system, the servo motors being further connected to said control electronic means for moving said cable linkages in response to the control signal received from said control electronic means as a result of any one of the first and second active control handles being actuated by a user along at least one of said pitch axis (x) and said roll axis (y), the control signal being further communicated to the control electronics means of the first and second control handle unactuated by a user such that the servo motors of the unactuated first and second control handle cause movement of the unactuated control handle in concert with the control handle actuated by a user.

2. A system as in claim 1 further comprising electronic disconnect means for selectively electrically disconnecting one of said first and second active control handles from the other of said first and second active control handles for preventing signals generated by the corresponding sensor means of said one of said first and second active control handles as a result of movement thereof from being reflected in the control signal received by the corresponding control electronics of the other of said first and second active control handles.

3. A system as in claim 1 further comprising mechanical connection means for mechanically connecting the cable linkages of the respective first and second active control handles to ensure said cable linkages operate together as a single unit.

4. A system as in claim 3 further comprising mechanical and electrical disconnect means for selectively disconnecting said mechanical connection means and the control electronics means of the first and second active control handles, respectively, to allow each cable linkage to operate independently of the other.

5. A system as in claim 1 wherein the control electronics means of each of the first and second active control handles generates a further control signal in response to the signal received from the sensor means of the respective first and second control handle, the further control signal being transmitted to a fly-by-wire flight control system for control thereof.

* * * * *